United States Patent
Guyer

(10) Patent No.: US 7,040,544 B2
(45) Date of Patent: May 9, 2006

(54) SYSTEM AND METHOD FOR WARM AIR SPACE HEATING WITH ELECTRICAL POWER GENERATION

(75) Inventor: Eric C. Guyer, Dover, MA (US)

(73) Assignee: Climate Energy, LLC, Medfield, MA (US)

( * ) Notice: Subject to any disclaimer, the term of this patent is extended or adjusted under 35 U.S.C. 154(b) by 64 days.

(21) Appl. No.: 10/704,358

(22) Filed: Nov. 7, 2003

(65) Prior Publication Data

US 2005/0098643 A1    May 12, 2005

(51) Int. Cl.
B60H 1/02    (2006.01)
(52) U.S. Cl. .................... 237/12.1; 60/39.01
(58) Field of Classification Search ............ 237/12.1, 237/12.3 B, 2 A; 60/39.182, 614, 660
See application file for complete search history.

(56) References Cited

U.S. PATENT DOCUMENTS

| | | | |
|---|---|---|---|
| 3,944,837 A | | 3/1976 | Meyers et al. |
| 4,065,055 A | * | 12/1977 | De Cosimo ................ 237/12.1 |
| 4,226,214 A | * | 10/1980 | Palazzetti ...................... 123/2 |
| 4,736,111 A | * | 4/1988 | Linden ........................... 290/2 |
| 4,752,697 A | * | 6/1988 | Lyons et al. .................... 290/2 |
| 4,754,607 A | * | 7/1988 | Mackay ........................ 60/723 |
| 5,226,594 A | * | 7/1993 | Swenson .................... 237/2 B |
| 5,535,944 A | | 7/1996 | Knowles |
| 5,617,504 A | * | 4/1997 | Sciacca et al. .............. 392/307 |

(Continued)

FOREIGN PATENT DOCUMENTS

DE    101 11 072 A1    10/2002

(Continued)

OTHER PUBLICATIONS

Bezilla et al., An Introduction of MCHP Unit for Residential use, National Micro-CHP Technology Pathways Workshop, Jun. 11, 2003, all pages.

(Continued)

*Primary Examiner*—Derek S. Boles
(74) *Attorney, Agent, or Firm*—Cesari and McKenna, LLP; William A. Loginov

(57)    ABSTRACT

This invention provides a system and method for cogeneration of building heat and electric power and that efficiently interfaces a warm air heating system with a liquid-cooled electric power generator. The system and method utilizes an electric generator that is rated at near the time-averaged electric power consumption for the building. This generator is operated as the priority source of heat for the building, but normally only when there is a demand for heat in building. In this manner, the generator can run to generate a significant part of the building's electric power but in a manner that is typically supplemented in variable quantities by power from a public power grid. The heat output is directed via a liquid coolant circuit on the generator, as needed, to the warm air heating unit for the building. The warm air heating unit blows return air through a cabinet and out to the supply duct(s). The warm liquid coolant is directed through a primary heat exchanger in the cabinet. The air is passed over this primary heat exchanger to provide heat to the building. When heat from primary heat exchanger is insufficient to heat the building fully, an auxiliary heater, operated typically by burning fuel, supplements the heat through one or more auxiliary heat exchangers arranged in line along the airflow path with the primary heat exchanger. The blower that directs the airflow is controlled variably in speed to create the most efficient use of electric power by the blower and a desirable heated air delivery temperature.

43 Claims, 8 Drawing Sheets

U.S. PATENT DOCUMENTS

| | | | | |
|---|---|---|---|---|
| 5,819,843 | A | * | 10/1998 | Inoue et al. ................ 165/219 |
| 6,053,418 | A | * | 4/2000 | Guyer ....................... 237/12.1 |
| 6,220,522 | B1 | * | 4/2001 | Suzuki .................. 237/12.3 C |
| 6,230,494 | B1 | * | 5/2001 | Botti et al. .................... 60/649 |
| 6,598,397 | B1 | * | 7/2003 | Hanna et al. ................. 60/651 |
| 6,662,563 | B1 | * | 12/2003 | Nordentoft ................... 60/616 |

FOREIGN PATENT DOCUMENTS

| | | |
|---|---|---|
| DE | 103 19 645 A1 | 11/2003 |
| EP | 0 457 399 A2 | 5/1991 |
| EP | 1 030 123 A2 | 8/2000 |
| EP | 1 045 127 A2 | 10/2000 |
| EP | 1 327 835 A2 | 7/2003 |
| WO | WO 98/26221 | 6/1998 |
| WO | WO 01/90656 A1 | 11/2001 |
| WO | WO 03/052254 A1 | 6/2003 |

OTHER PUBLICATIONS

Powering Your Home or Small Business, Vector CoGenLLC Technical Specifications Parallel with grid or standalone Cogenerators, Sep. 1, 2003, Http://www.vectorcogen.com/pages/specifications.htm, all pages.

"Notification of Transmittal of the International Search Report and the Written Opinion of the International Searching Authority, or the Declaration" International Application No. PCT/US2005/013425, with an International Filing date of Apr. 19, 2005.

* cited by examiner

SYSTEM AND METHOD FOR WARM AIR SPACE HEATING WITH ELECTRICAL POWER GENERATION

BACKGROUND OF THE INVENTION

1. Field of the Invention

This invention relates to the cogeneration of space/water heat and electrical power.

2. Background Information

In most regions of North America, space heating of buildings is a necessity for some portion of the year to maintain thermal comfort. Buildings are space-heated in a variety of ways, with one of the most common being forced warm air heating, using a blower to move the air over a centrally located heat exchanger. The majority of such heat exchangers are warmed directly by using the hot gases produced by a fossil fuel burner.

Buildings also require a source of electric power. Forced warm air space heating systems are in themselves a significant user of electric power. This electric power is normally provided by an electric utility through the local electric grid, with the generation of the electric power occurring at large power stations remotely located from the building. All forms of electric power generation at large remotely located generating plants result in a large fraction of the fuel energy being normally dissipated as waste heat. The combination of electric power generation with useful application of the heat energy that is inevitably produced during electric power generation is generally termed "cogeneration." Cogeneration is the simultaneous production of useful electric power and heat from the same fuel and fuel burner.

Small-scale cogeneration of heat and electric power from fossil fuels to meet the on-site energy needs of residential and commercial buildings represents a major opportunity for reduction of energy costs and pollutant emissions, including $CO_2$ greenhouse gas. There is a general trend in the regulatory management of energy resources to specifically allow and encourage the tie-in of small-scale cogeneration and renewable energy systems into the existing electric utility grid. This benefits the power generating authorities by allowing them to delay construction of new capacity. However, there is as yet no widespread use of small-scale cogeneration. The technical and economic inadequacies of existing small-scale cogeneration technologies, as well as historical energy supply and regulatory practices, have perpetuated this situation. A number of small-scale power generation technologies are emerging that may be used in such small-scale combined heat and power systems. These include internal combustion engines, Stirling engines, fuel cells, and steam engines. Small-scale combined heat and power systems are now commonly referred to as micro-combined heat and power systems or, more briefly, "micro-CHP" systems and will be referred to as such in this discussion for convenience.

To date, little attention has been paid to specifically how such small-scale power generation technologies would be practically integrated into central forced warm air heating furnaces and systems. Warm air is by far the most common type of space heating system used in residential buildings in North America. Also, nearly all candidate generator technologies suitable for use in small-scale cogeneration of electric power and heat incorporate a liquid cooling (for example, glycol, water, and mixtures thereof) circuit and are not practically or conveniently implemented with direct air cooling of the key function components. A small scale cogeneration design that is a simple additive combination of warm air heating units of conventional design with available liquid cooled electric power generation devices is neither mechanically or electrically practical and will lead to inefficient and expensive systems. An integrated system design as described herein that addresses the combined and complementary mechanical, thermal, electrical power, and control characteristics of all system components is essential to practical realization of warm air heating systems with cogeneration capability.

Many prior art cogeneration systems are targeted toward large-scale facilities, with designs that do not scale-down to a residential/small commercial application. They may involve the use of gas turbines and steam plants that cannot be reproduced for a residence. While attempts to produce a small-scale cogeneration system have been made, these either do not interface with commonly used warm air-handling systems, or are impractical to employ in a "real-world" application.

Taken individually or as a whole, the prior art fails to provide an overall design for a practically implemented forced fossil-fueled warm air heating system of modem features combined with an efficient, fossil-fueled electric generator with liquid heating capability with such combination system of providing space heating for thermal comfort while simultaneously maximizing the operation of the electric generator for the cogeneration of heat and electric power and providing the important additional functionality of emergency power supply. Hence, a practical, up-to-date and efficient small-scale cogeneration system, that is particularly suitable for use as a modern forced warm air heating system employed in many homes and enterprises, is highly desirable.

SUMMARY OF THE INVENTION

This invention overcomes the disadvantages of the prior art by providing a system and method for cogeneration of electric power and building heat that efficiently interfaces a liquid-cooled electric power generator with a warm air space heating system. The system and method utilizes an electric generator with an electric output capacity (kW) that is near the time-averaged electric power consumption rate for the building and with a heat generation capacity that is useful for meeting building heating needs. This generator is operated as the priority source of heat for the building, but normally only when there is a demand for heat in building, with the intent of running the generator for long periods of time and generating a total amount of electric energy (kWhrs) that is significant in comparison to the total electric energy consumption of the building over time. The actual onsite time-variable power demand (kW) is met by a combination of the cogenerated electric power produced on site and quantities by electric power from the public electric power grid or another external power source. In essence, useful electric power is generated on site as a byproduct of the required generation of heat.

The heat output of the electric generator is directed via a liquid coolant circuit on the generator, as needed, to the warm air heating unit for the building. The warm air heating unit blows return air through a cabinet and out to the supply duct(s). The warm coolant is directed through a primary heat exchanger in the cabinet. The air is passed over this primary heat exchanger to provide heat to the building. When, heat from primary heat exchanger is insufficient to heat the building fully, an auxiliary heater, operated typically by burning fuel, supplements the heat through one or more auxiliary heat exchangers arranged in line along the airflow path with the primary heat exchanger. The blower that directs the airflow is controlled variably in speed to create the most efficient use of electric power by the blower while maintaining a desirable heated air delivery temperature. The generator is run at a speed/operating condition that is appropriate to maintaining a long operational life. A control module is provided to regulate these and other relationships between operational components so that during heating, the utilization of the power generator as the heat source is maximized, the power consumption of the warm heating system is minimized, the use of auxiliary heating capacity is minimized, and the thermal comfort is maintained in the building. According various embodiments, the auxiliary heater can be a two-part unit with a burner-adjacent exchanger downstream is (in the airflow) of the primary heat exchanger and a condensing heat exchanger upstream of the primary heat exchanger. An outdoor temperature sensor can be beneficially used to improve the heat demand anticipation of the system and further maximize the use of the electric generator as a heat source. The auxiliary heater can also be driven by warm liquid from a supplemental fuel-driven liquid heater. Domestic water heating can be provided by the generator circuit or by the auxiliary liquid heater. The various heater and generator combinations can share intake ductwork and combustion product vents as well as condensate drains. The generator can be mounted indoors or outdoors. As an added feature, the warm-air heating unit can be fitted with an air conditioning unit. During periods of electrical grid power failure and when heat is not needed, the system provides for the operation of the electric generator and the coolant loop can be redirected to a heat dissipater or radiator. Similarly, where the generator must take over for the power grid in the event of an outage, it may be run by the control module at a higher electric power output level/speed and excess heat may be dissipated if necessary.

To provide a more-even and immediately plentiful supply of heat, an intermediate buffer tank is heated by the generator's heat and the heated liquid in the buffer tank can be directed to the heating unit and domestic water supply to supply their needs. Likewise, the primary heat exchanger can receive heated coolant from both the generator and an auxiliary liquid heater on a common circuit, eliminating the need for multiple heat exchangers in the cabinet.

BRIEF DESCRIPTION OF THE DRAWINGS

The invention description below refers to the accompanying drawings, of which.

DETAILED DESCRIPTION OF AN ILLUSTRATIVE EMBODIMENT

Figure 1:
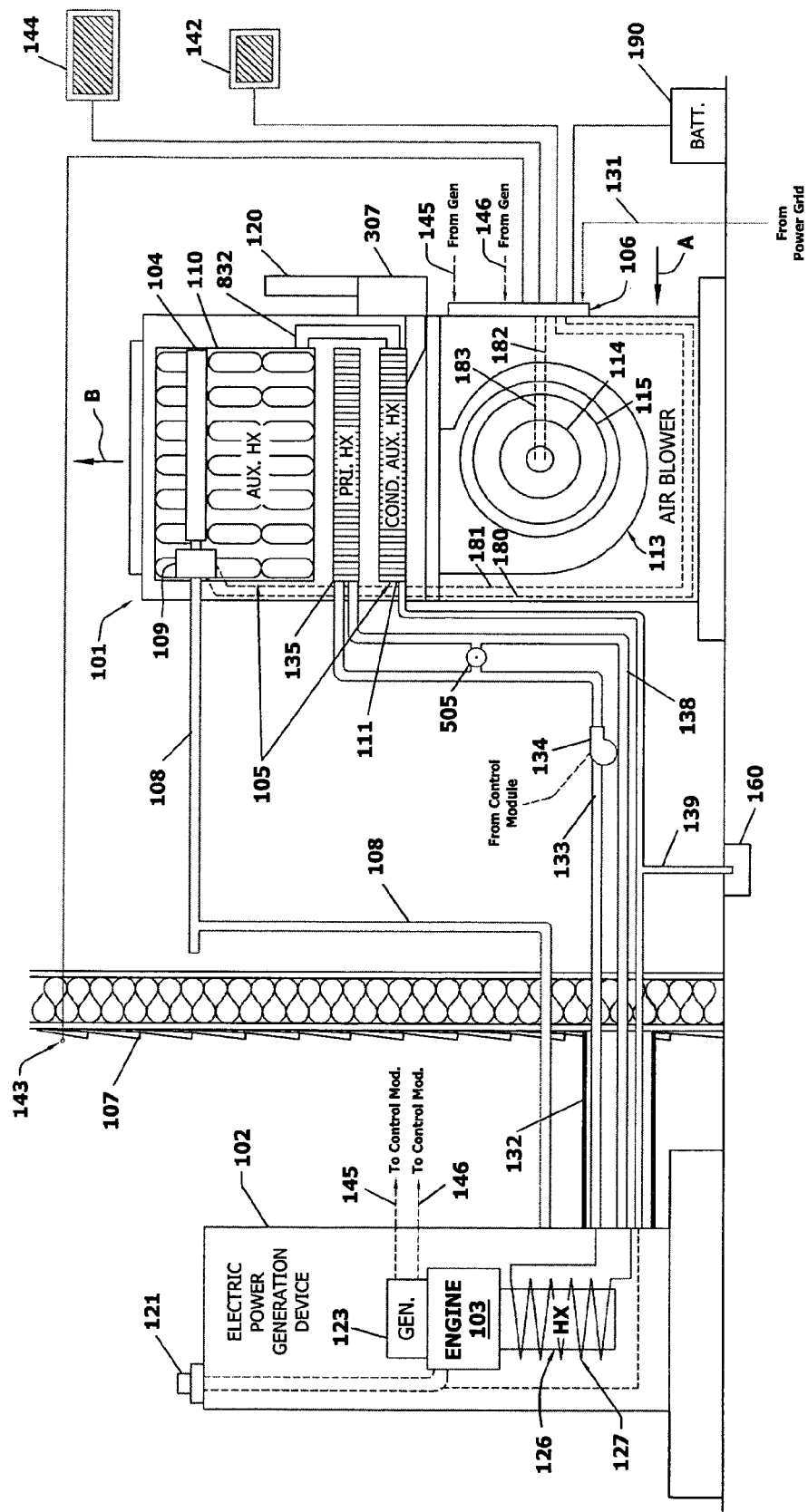
FIG. 1 is an exposed view of a warm air micro-CHP system according to an illustrative embodiment employing an outdoor-installed power generator.

FIG. 1 illustrates a warm air micro-CHP system installed in a typical residential application according to an embodiment of this invention. The air heating assembly 101 is located within the interior of the residence space. The electric power generator 102 is located outdoors. While not shown, a series of vents and ducts interconnect with the air heating assembly to channel heated (and optionally) cooled air to various points in the structure. For smaller installations, the air heating assembly may vent directly into the space without significant runs of ductwork. Likewise, return air can enter a duct adjacent the system 101 or be channeled from a remote location(s) in the structure via appropriate ductwork (not shown).

In this embodiment the air heating assembly 101 is interconnected by a coolant loop to a power generator 102 that is located outside the structure, on the opposite side of the building wall 107. As defined herein, the power generator 102 can be any acceptable electric generating device that converts fuel into energy electric and heat. The power generator 102 consists of a liquid cooled engine (the term "engine" as used herein including, for example, an internal combustion engine, steam engine, Stirling engine, fuel cell, or another liquid-cooled, heat-producing type and powered by alcohol, wood products, gasoline, diesel, hydrogen, propane, natural gas or another fuel). In this embodiment, the generator is a fuel-powered internal combustion engine 103 that operates an electric power generator 123. The fuel line 108 is a gas or fuel oil line that also services the burner 104 of the heating system's auxiliary heater 105 (described further below). The generator 123 directs power over a cable 145 to the residence through an interface on the control module 106 for the system. Control signals are, likewise, exchanged between the power generator 102 and control module via a cable 146 (or another acceptable link). These signals control starting and stopping of the engine 103, its speed, power output and monitor various functions.

In an illustrative embodiment, the sizing of the power generator takes into account the annual time-averaged electric power consumption for the typical home in United States, which is approximately 1 kilowatt. This time-averaged power demand of about 1 kilowatt yields, with a year comprising 8760 hours, a total electric energy demand of approximately 8760 kilowatt hours per year. Thus, without consideration to matching electric loads to on-site electrical generation capacity, the desired size of a residential electric generating machine would be about 1 kW, operating continuously throughout the year. Electric generators of the durability and quality that would apply to use in a warm air micro-CHP system are generally expensive and for this reason it is very desirable that the electric generator be of a minimum size and operated with high utilization (i.e., high load factor). As practical matter, in many instances, the limited electric power generation capacity of a micro-CHP system, such as the 1 kW capacity mentioned, and the varying onsite electric loads can be accommodated by a parallel connection 131 to the utility grid, with power flowing in from the grid when demand exceeds the generation capacity of the on-site generator and power flowing out to the grid when the generation capacity of the on-site generator exceeds the on-site demand. Such produced, or cogenerated, electric power is most conveniently applied by direct interconnect with the local electric grid that provides a constant electric load, independent of the actual power consumption level at any given time in the building itself, such connection generally know as parallel connection to the utility grid. Such an arrangement is most attractive under a "net metering" financial arrangement between the producer of the cogenerated electric power and the electric utility company, but other uses and economic arrangements for valuing such power generation are feasible and within the capability of the present invention. Batteries 190 can also be used to accommodate the steady generation and time varying electric load, but not as conveniently. Such batteries are charged via regulation provided by the control module 106.

The consequence of this preferred sizing of approximately 1 kW for routine power generation to the design of a warm air micro-CHP system is that the available heat generation capacity of the electric power generating device, at about 1 kW, will be small in comparison the typical needed installed capacity for space heating. With the approximate 20% fuel to electric conversion efficiency that is attainable with small electric generators, a 1 kW electric generator will at best produce about 4 kW of heat. Assuming 90% of this kW of heat can be usefully recovered, the net heating capacity will be about 3.6 kW thermal. This is to be compared to the typical installed capacity of the typical warm heating system in a home of about 30 kW thermal. The thermal output capacity of the electric generator would be thus only be slightly more than 10% of the normal installed capacity for heating. Operation of the electric generation at this limited heating capacity can still supply a substantial total fraction of the annual heating energy in a warm air micro-CHP system on account of the fact that the full heating capacity is typically needed for only few hours on the coldest days of the year. Nonetheless, it must be supplemented by an auxiliary heating system of capacity nearly equal to that which would normally be installed (with no micro-CHP system).

One example of an acceptable electric power generator for use with the various embodiments described herein is the MCHP generator unit, currently under development by Honda Motor Corp. of Japan. This generator utilizes a single cylinder 163 cc-displacement engine that produces 1 kW of electric power at continuous run levels along with 3.25 kW thermal energy via a built-in coolant circuit. This circuit includes an integral inlet and outlet that can be interconnected with conduits 133, 138 to provide the needed circulation of heated coolant according to this invention. As noted above, use of other types, sizes and models of generators is expressly contemplated.

In this embodiment, the electrical power generator 102 is located outdoors, adjacent to the building wall. This allows direct venting of the products of combustion to the outdoors with no chance of indoor potentially hazardous leakage and greater safety against fire or other hazards that may be associated with the power generator. However, a variety of indoor placements are expressly contemplated. Noise, vibration, odor, or safety aspects of any particular electric power generator may it may make it feasible to install the generator indoors. As will be described below certain embodiments contemplate alternative placement of the generator indoors.

The engine 103 includes a heat exchanger 126 that can be part of the engine block or a heat sink. In general, the heat exchanger is an element that may be normally provided to the engine in a commercial embodiment., and the coolant circuit is directed, via insulated coolant circulation conduits 133 and 138 (herein shielded by an insulated cover 132) through the wall 107, and into the structure's interior to connect with the air heating assembly 101.

The products of reaction or combustion of the fuel in the power generation device (exhaust) are vented directly to the outdoors through vent 120. Water condensate, which may be normally produced in the burning of many fuels in such devices, is routed in the condensate conduit 139 into the building for disposal in a drain 160. For example the water vapor dew point of condensate in burning natural gas is approximately 135° F. The water condensate conduit 139 is routed under the same cover of thermal insulation 132 as the liquid circulation conduits 133 and 138 in order to avoid freezing of the condensate during cold weather. Without an adequate means to dispose of condensate (and assuming it is vented directly to the ground around the generator) an ice hazard can develop during cold months. By routing the condensate flow along with the heated liquid lines, through the cover 132, and back into an interior drain, freezing is normally prevented. Indeed, since the operating logic described herein for the micro-CHP system calls for essentially continuous operation of the electric generator during sub-freezing outdoor temperatures, such heating of the condensate lines would be assured.

Figure 8:
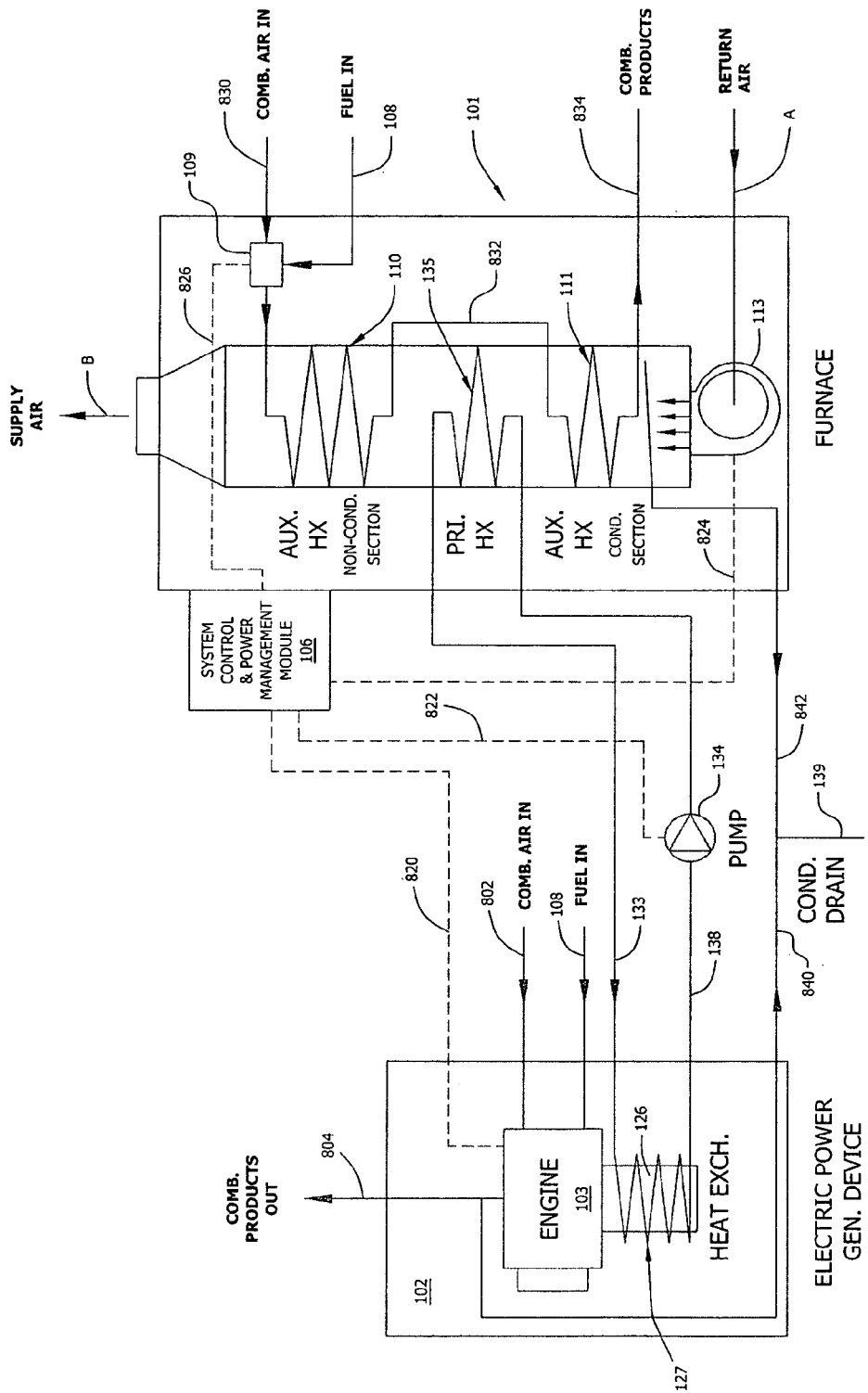
FIG. 8 is a schematic diagram of a generalized flow through the warm air micro-CHP system of FIG. 1.

The conduits circulate coolant flow using an inline circulation pump 134 that has a rating sufficient to maintain proper heat exchange. The control of the pump 134 and other aspects of the system are further described with reference to FIG. 8 below.

A primary heat exchanger 135 is contained in the airflow cabinet and duct of the air heating assembly 101 along with the auxiliary heater 105 and the variable-speed air blower 113. More particularly, the auxiliary heater 105 is a fuel-fired device that can heat the air stream (arrows A and B). The configuration of the auxiliary heater 105 can be any of a number of common designs for warm air space heating systems, most often consisting of the fuel supply 108, burner 104, fuel valve 109, interspersed combustion gas and air passages 110 and 111, and vent 120 for the products of combustion (exhaust). In this and other embodiments, a combustion product blower 307 assists in venting combustion products.

In an illustrative embodiment, the auxiliary heater 105 is of a type that heats circulated air using fossil fuels. Most commonly such a heater employs sheet metal exchangers that separate the flow of hot combustion products from the circulated building air while providing a direct path for heat conduction and transfer from the hot combustion gases to the circulated air. In the illustrative embodiment, the primary exchanger is best located upstream (with respect to the circulated airflow) of the auxiliary heater on account of being able to provide, at that location, the lowest temperature air returning from the heat space to the primary heat exchanger, thus enabling the lowest temperature cooling of the electric power generating device. The present invention also recognizes that many fossil fuel warm air heating technologies now employ two separate heat exchangers. One is called the non-condensing heat exchanger and the other is called the condensing heat exchanger in reference to the occurrence of condensation of water vapor of the products of combustion in the heat exchanger. In using such two-part heat exchangers in the auxiliary heater 105 of the illustrative embodiment, it is desirable that the primary heat exchanger be located, with respect to the air stream flow, between the non-condensing part of the auxiliary heater and condensing part of auxiliary heater. In particular, while it is useful to locate the primary heat exchanger upstream (with respect to the circulated airflow), of the non-condensing part or the auxiliary heater it is desirable, from a total-performance perspective, it is more-effective to locate the condensing passages 111 of the auxiliary heater 105 upstream of the primary heat exchanger 135—since the performance of the condensing part of the auxiliary heater 105 is more-strongly dependent on the temperature of the building return air, with the coolest air providing the highest performance in terms of combustion heat recovery efficiency.

The auxiliary heater 105 may have the capability of working at different levels or stages of heat output as is now commonly found in warm air heating furnaces. The auxiliary heater 105 may be of either the condensing or non-condensing type, referring to whether or not the unit is a high-performance heat exchanger that cools the combustion products to a point where water vapor in the combustion products is condensed or is a low or medium performance heat exchanger that cools the combustion products to a temperature that is above the water dew point of the combustion products. In the illustrative embodiment, the auxiliary heater 105 composed of the non-condensing passages 110 and the condensing passages 111, as typical of the design of such condensing warm air space heating devices now in wide use. In the illustrative embodiment, the primary heat exchanger 135, which receives the heated coolant flow from the power generator 102 is disposed between the condensing passages 111 of the auxiliary heater 105 and the non-condensing condensing passages 110 of the auxiliary heater 105, but it is expressly contemplated that other arrangements of these elements can be made.

The auxiliary heater 105 is connected to the control module 106 by the electric power conducting cables 180 and 182 and the control signal cables 181 and 183 that respectively provide both motive power and operational control to, for example, the blower 113 and fuel valve 109. In general, the control module 106 operates to receive signals from any of the components of the warm air micro-CHP system and make any control actions necessary to sustain the performance, safety, and integrity of the warm air micro-CHP system. A further function of the control module 106 is to operate the blower at the appropriate speed depending on the functional state of the primary heat exchanger 135 and auxiliary heater 105. Its operation is described in greater detail below.

The use of a variable or multiple-speed blower for air circulation to the heated space is desirable according to an illustrative embodiment. The blower and motor should be operable at relatively low speed with very low electric power consumption and low noise. Many modern warm air heating furnaces, and most all old warm air furnaces for residential space heating, operate with a single blower speed and heating capacity, typically of the approximately 30 kW heating capacity described above. More recent warm air heater designs utilize several stages of proportioned firing and airflow (blower speed) to achieve a reasonably constant temperature of air delivery and instantaneous heat delivery rates that are a better match to real variations in the space heating demand. This multi-stage furnace operation results in increased time periods of blower operation, increased opportunity for air filtration, closer control of the space temperature, reduce operation noise, and generally more uniform temperature of the air in the heated space. Indeed, in recent years, constant blower operation throughout the heating season has been encouraged to further improve air circulation and provide uniform temperature distribution throughout the heated space—with there being time periods when there is no heat input at any level. However, this mode of constant low-level air circulation only makes sense if the blower-motor functions efficiently at the low speeds.

The present invention ideally provides constant low-level air circulation because the reduced blower speeds used for such constant circulation are generally sufficient to provide the airflow needed to transfer the heat from primary heat exchanger 135 that is connected to the electric power generator 102. Thus, it is contemplated that continuous, or near continuous, operation of the electric power generation device through the heating season can be achieved. As noted before, the rated capacity of the blower must be sufficient to deliver about 30 kW of heat under maximum heat load conditions, while the blower need only provide airflow for the delivery of about 3.6 kW of heat during the operation of the electric power generation device. Thus, the same, or similar, low rate of airflow, that is desired for constant air mixing and air circulation as noted above can be the same airflow that is adequate to allow for the near continuous operation of the electric power generation device and the useful application of its heat generation for space heating.

The multi-speed air blower 113 can be on any of the common types used in warm air space heating systems, generally consisting of centrifugal blower wheel 115 and an electric motor 114. The electric motor 114 is desirably a high-efficiency motor that maintains such high efficiency in the conversion of electric power to shaft power to drive the blower over a wide range of operating speeds and torque loading. This motor can be a so-called electronically commutated motor and other similar type. As noted, the electric motor 114 is connected to the control module 106 by the electric power conducting cable 182 and the control signal cable 183. As described generally above, the range of blower speeds should provide an appropriate flow of air at the relatively low heat output of the primary heat exchanger 135 when it alone is operating and an appropriate flow of air at the relatively high heat output existing when the auxiliary heater 105 is operating at full capacity in conjunction with the primary heat exchanger 135. The ratio of the airflow rates at the limits of operation of the blower speed (high/low) for the warm air micro-CHP CHP system operation may be in range of approximately 3 to 8, depending on the specific size of the components.

The control module 106 is connected to an indoor thermostat 142, outdoor temperature sensor 143 and a control-display panel 144 that provides status and interface information for the cogeneration system. The thermostat 142 can be any of the commercially available models used for control of the space heating systems in buildings.

Figure 6:
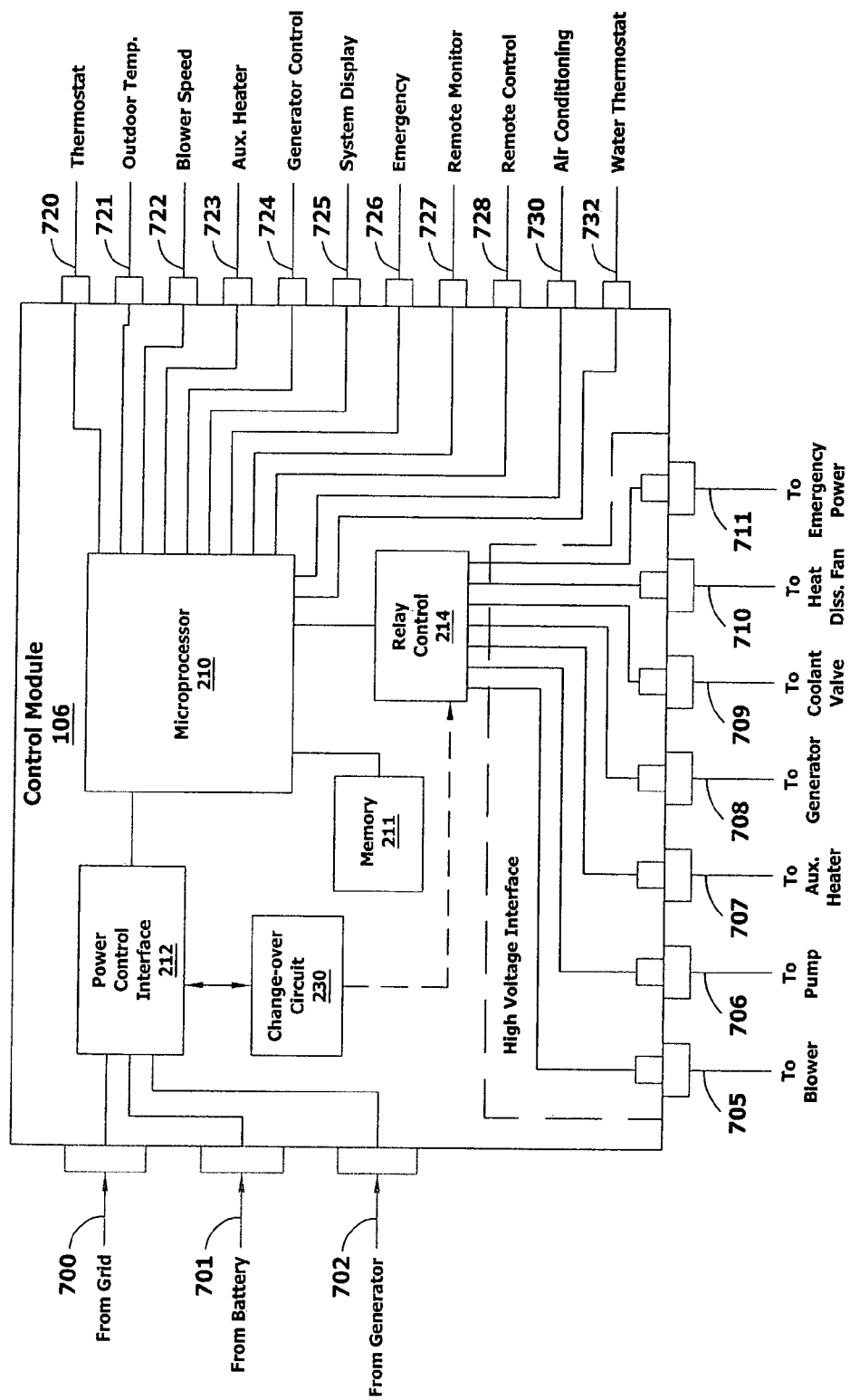
FIG. 6 is a schematic block diagram of a control module for a warm air micro-CHP system according to an illustrative embodiment.

The control module 106 according to an illustrative embodiment is shown in FIG. 6. The control module 106 contains electric power switching elements and electronic logic and control elements. The module 106 is managed by an on-board microprocessor 210 that accesses a program memory 211 for both operational instructions and storage of user/system-input settings and information. In addition, the microprocessor controls (typically high-voltage) outputs to operate the various mechanical components of the system. A multi-port relay control 214 interfaces with the microprocessor, and selects which outputs to operate via the relay control 214. A variety of models and types microprocessors, microcontrollers, state machines and the like, and associated control programs can be employed—and these should be clear to those of ordinary skill. Based upon the appropriate program, the microprocessor interprets sensor inputs to carry out the functions needed for system operation as outlined generally below.

More particularly, the microprocessor communicates with various sensors (connections 720–728) that monitor various statuses and operational parameters. The microprocessor 210 also interfaces with a power control interface 212. This interface handles high voltage inputs from the grid, battery and power generator 102 (connections 700–702) and the microprocessor monitors and balances these inputs based upon the interface's signals. The electric power connections to the control module 106 may include: electric power from the grid 131 (connection 700); electric power from the battery 190 (connection 701); electric power from the electric power generator 102 (connection 702); electric power to the air blower motor 114 (connection 705); electric power one or more circulation pumps 134 (connection 706); electric power to the auxiliary heater (105) combustion and operating controls (i.e. valve 109) (connection 707); electric power to starting elements of the power generator 102 (e.g. engine starter motor, etc, not shown) (connection 708); electric power to coolant loop circulation valve or valves (connection 709); electric power to a fan on the heat dissipation heat exchanger (connection 710); and electric power to one or more circuits (changeover switches) to supply emergency electric power during grid power outages (connection 711). Control circuit connections, either analog or digital, to the control module 106 include the building thermostat circuit (connection 720); the outdoor temperature sensor circuit 143 (connection 721); the air blower speed control circuit (connection 722); the auxiliary heater control circuit (connection 723); the power generator control circuit (connection 724); a circuit to the system operating and control display 144 (connection 725); a circuit to control the switching of electric power from the grid to the electric power generating device during grid outages (changeover switch—not shown) (connection 726), a circuit for remote monitoring of the system performance (connection 727), and a circuit for the remote control of the electric power generating capability (connection 728). The control module may also be configured with electric power and operating logic and control circuits that provide for operation and control of multiple heat zones in the building, each with their own thermostat. The control module can also include control logic and hardware for remote control as well as remote and local monitoring and diagnosis of the micro-CHP system.

Having described its general structure, the control module 106 functions so as to operate the various components of the system such that they make maximum use of the power generator 102 as the source of heat energy for warm air space heating while maintaining the thermostat 142 at the desired building set-point temperature. The control module 106 therefore operates the warm air micro-CHP system with the following basic logic:

a. when a space heating demand is detected by a thermostat 142, space heat is first and preferentially supplied by the primary heat exchanger 135 through operation of the circulating coolant pump 134, the air blower 113 (under speed conditions that minimize power consumption of the blower for a given heating need), and the power generator 102;

b. when the space heating demand cannot be satisfied in a reasonable time by the heat energy supplied by the primary heat exchanger 135, as detected by a thermostat 142 located in the heated space and the evaluated by control logic embedded in the control module 106, the auxiliary heater 105 is also operated, at one or more stages of heat delivery capacity, to deliver the additionally needed heat until the demand is met as detected by the thermostat; and c. when there is a direct call for operation of the auxiliary heater 105 by the occupant the auxiliary heater will first be operated at its lowest level of heat output, and then operated at successively higher levels of heat output, that may be available, based on logic in the control module 106 that seeks to achieve satisfaction of the heat demand, within a reasonable period of time, at operation at the lowest level of heat input.

The warm air micro-CHP system operation as described above can be improved through the use of the outdoor temperature sensor 143 and additional control logic in the control module's microprocessor 210 that uses the outdoor air temperature for anticipating the heating demands that will signaled by the thermostat 142. More particularly, this sensor 143 provides a signal to the control module 106 indicating that there is a sustained need for heat supply to the building. Once the outdoor temperature drops below a selected set point, such a 50° F., the control module 106 calls for the continuous operation of the electric power generator 102 and heat supply to heated space by the primary heat exchanger 135 and air blower 113. According to these parameters, operation of the generator 102 is terminated if the thermostat 142 or other temperature sensor located in the building's heated space indicates that the temperature of the heated space has risen some small amount above the set point, thereby indicating that excess heat is being supplied. This additional level of heat load detection and control logic provided by the outdoor temperature sensor provides an anticipatory control function that tends to increase the use of the electric power generator 102 as the source of heat for the building, and conversely, minimize the use of the auxiliary heater 105. The control module's microprocessor can also be provided with self-learning logic, that automatically adjusts the temperature set point of the outdoor sensor 143 based on the operating history of the system to maximize the run time and total heating contribution of the electric power generating device 102. The outdoor temperature sensor is also an important feature in maximizing the use of the electric power generator as the priority source of heat when the thermostat 142 is of the "setback" type. However, the general value of the setback thermostat in conserving heating fuel will still be achieved. Setback thermostats normally result in long periods of inactivity of the conventional heating units as the temperature in the building drifts down to the temperature setback setting (say 70 F to 60 F). The outdoor temperature sensor 143 in this situation will continue to signal the underlying need for heat during the setback period. The net result will generally be a slower drifting of the room temperature to the setback setting, an effect that will not likely be noticeable to building occupants.

Based upon the foregoing, it should be recognized that the majority of the heat energy supplied to the building can be supplied by the primary heat exchanger over the heating season. In almost all geographic areas, to a differing extent, the greatest heating demand (very cold days) is relatively rare. A conventional heating system must, however, have capacity to deal with that rare event, and the installed capacity is set for that event, but the time-averaged heating capacity is much less than the maximum and the heat-producing electric generation system of this invention is tailored to that average heat demand. The primary heat exchanger and generator, in essence, provide the base heating capacity during the more prevalent hours of cool and moderately cold weather and are supplemented by the auxiliary heat exchanger typically only for the less frequent and more-severe outdoor temperature conditions.

A further function of the control module 106 is to operate the electric power generator 102 during periods of electric grid outage (emergencies, blackouts, etc.) so that the operation of the complete warm air micro-CHP can be sustained and certain priority electrical loads (water, heat control, basic lighting, refrigeration, etc.) in the building can be sustained during the outage.

Note that the system is adapted to provide for electric power demand during a grid outage that may exceed the normal rated power capacity (for example the 1 kW considered appropriate for routine cogeneration of heat and electric power throughout an average year). This feature of the invention maximizes the utility of the components in the system by providing a high-power operating state for the power generator 102. In general, the lifetime of many electric power generating devices is dependent on the rate or speed of operation. An internal combustion engine-powered electrical generator is good example of this general principle. For the routine and cost-effective cogeneration applications, equipment lifetimes exceeding about 10,000 to 20,000 hours are desired. To achieve such long lifetimes, the engine is typically operated at only low or moderate speeds. However, during periods of electrical outage, which constitute a very small percentage of the total operating time (typically less than 1%) it would be permissible to operate the engine at a higher speed to generate additional power—provided that the electrical components, engine cooling system, and other components are also designed to handle this higher speed. For example, an engine running normally at 1 kW and 1800 rpm might be set to run at a peak of 2500 rpm to achieve a 2 kW output for limited time periods. Thus, the illustrative embodiment includes in the control module 106 the capability (via signal output 726, etc.) to temporarily switch the electrical generator device into a higher speed or rate of operation that, while not desirable for long-term cogeneration duty, would be acceptable for the relatively short duration of electrical outages.

For emergency operation, the control module 106 further includes changeover circuitry 230 that can isolate, automatically or manually, the electrical output of the generating device 102 from the incoming power line of the electric utility and routing the produced electric power to electrical loads present within the building. Part of the priority electrical load to be sustained by the generator 102 during an outage is the warm air heating system itself, with its blower, pump, ignition controls, operating controls and other electric power-consuming components (represented generally by interface connections 705–711). These components must be switched from the electric grid to the power output terminals of the power generator 102. The control module 106 also may have the functionality of signaling the power generator to operate at a higher electric power output during the period of time that the electric grid outage is occurring, so as to increase the amount of electric power available for use in the building during the outage (signal output 726). Further, the control module 106 may have the capability of providing power from the battery 190 (via input 701) to the power generator 102 for starting during periods of electrical outage (via output 708).

While not shown in FIG. 1 for clarity, each of the embodiments herein contemplates interconnection of the control module 106, air heating assembly 101 and power generator 102 with an air conditioning/space cooling system 116 (See for example FIGS. 2–5 and 7). Thus, the control module 106 can also include a connection point 730 for integration micro-CHP controls with the control of an air-conditioning system consisting of a refrigerant evaporator coil 151, an outdoor refrigerant condensing unit 150 and inter-connecting refrigerant lines 153 and 154, so as to provide for the operation of the air blower 113 when there is a demand for cooling of the building space. The control module 106 can also have the capability for connection to the well-known Internet or another communication network for the purposes of remote monitoring (via connection 727) of the system performance from off-site locations and the purposes of off-site controlling (via connection 728) of the operation of the power generator 102, as may be desirable during periods of peak electric demand.

The control-display panel 144 is provided for the purposes of displaying the history and current status of the system operation, including the operating mode, fuel usage, electric power generation, and the occurrence of any operational failures, abnormal operating conditions, or other system fault messages that may be appropriate. The control-display panel 144 can be located at any location within the building and also provides a convenient location for changing of system control settings, such as a basic on-off switch and the outdoor temperature constant-run setting as described above. As also noted, the panel can be supplemented with a display running interactively on the graphical user interface of a personal computer (not shown) in the building, or at a remote location anywhere in the world. This computer, when located locally, can be directly connected to the module 106 via a network cable or another appropriate interface (using, for example, connections 727 and 728). Appropriate network interface cards can be provided to both the module 106 and the computer. The computer should include a software application that interprets a data stream from the module, and that enables control inputs to the module. A graphical user interface can be provided to display and manipulate such data. Construction of such an application and interface should be clear to those of ordinary skill.

It should be noted that, in the illustrative embodiment, the primary heat exchanger 135 is specifically designed for the low and high airflow conditions required by the warm air micro-CHP system. During a majority of its operation, the main air blower 113 of the system operates at a low-flow condition (speed) and transfers the heat from the liquid coolant of the electric power generation unit to the building air stream. During periods of high heat demand in the interior spaces, the main air blower 113 of the system operates at a high-flow condition (speed) and the auxiliary heater 105 provides additional space heat needed to maintain a reasonable supply air delivery temperature. The primary heat exchanger 135 is specially adapted to have an acceptably low airflow pressure loss at high airflow conditions, while also providing adequate capability to transfer the heat from the coolant at low airflow conditions and reasonable coolant temperature (i.e, a temperature within the desired coolant temperature range of the electric generation device, with such temperature often bounded by a low limit and a high limit).

This invention also contemplates and further utilizes the control capability of the variable speed main air blower 113 to regulate the liquid coolant temperature for optimum operation of the generator, whilst providing heated airflow to the building consistent with current heat demands. The liquid coolant temperature can be regulated between the desired minimum and maximum by increasing the airflow rate on a rising temperature of the coolant and decreasing the airflow rate on a declining temperature, all this being accomplished by utilizing the same variable-speed capability of the blower that has been incorporated to operate with the different levels of heat input provided by the auxiliary heater 105.

It is further desirable that the primary heat exchanger 135 be adapted to fill the entire airflow area directly above and closely coupled to the condensing part 111 of the auxiliary heat exchanger, thereby providing uniform pressure drop, uniform airflow and optimum heat transfer across the entire surfaces the several heat exchangers and to minimize the overall size of the system. In the case where the auxiliary heat exchanger is composed of only a non-condensing part, the same close coupling and matching of airflow areas is desirable for similar reasons. This matched airflow area and close coupled design results in a situation wherein the entire airflow passes through the primary heat exchanger in both the low and high airflow conditions. Hence, the high airflow required during the auxiliary heat condition will tend to depress the liquid coolant temperature to a level that may adversely affect the operation of the electric power generation unit. The high airflow will tend to overcool the liquid coolant compared to operation at the low airflow rate that is normal during periods when only the primary heat exchanger is operating. In order to regulate the liquid coolant temperature under these high airflow conditions, the liquid coolant piping includes a thermostatic by-pass device 505 located between the supply and return liquid coolant piping of the electric power generation unit, as shown in FIG. 1. This device maintains an optimum temperature level for the proper operation of the electric power generation unit by bypassing some of the coolant flow around primary heat exchanger, causing the coolant temperature to equilibrate at a higher, more desirable, operating temperature Before describing various alternate embodiments of the warm air micro-CHP system according to this invention, reference is made to FIG. 8 which provides the reader with an understanding of the mass flow characteristics of the basic system as shown in FIG. 1. Fuel enters the engine 103 via line 108 along with combustion air (line 802). These react to generate electricity via the generator that is routed through the control module 106 (through one of the depicted dashed lines (dashed line 820) indicating an electrical/signal link). The engine's combustion products are vented as exhaust (line 804). heat created in the combustion is routed through a heat exchanger 126 that carries it away from the engine 103 to prevent overheating (but not to the point of overcooling through use of a conventional engine cooling thermostat—not shown). As needed, a circulation of coolant is driven by the pump 134 (connected to module 106 by dashed line 822) to pass coolant through the heat exchanger 126 (via coil circuit 127 and conduits 133 and 138) thereby carrying off heat.

The coolant, carrying the heat from the engine 103, passes through the primary heat exchanger 135 in the cabinet of the air heating assembly 101 where cooler return air A is blown at an appropriate rate (controlled and powered by dashed line 824) and is warmed by removing heat from the heat exchanger and delivering it to the warm air supply B for the building. In this basic embodiment, the air heating assembly 101 is supplemented with a two-part conventional heater. The first part is a fuel burner-fired non-condensing heat exchanger that receives combusted fuel and air through a burner 109 that is controlled and powered via dashed line 826. Fuel for the burner 180 is received from line 108 and combustion air is received via line 830. Hot combustion gas passes through the first part 110 over a bridging section 832 (around the primary heat exchanger 135) and into a condensing second part 111 that is upstream of the primary heat exchanger 135. The combustion gas exits the second part 111 substantially cooled, as the majority of heat is transferred to the airflow A-B as needed. This is vented as combustion products along line 834. Combustion typically produces water as a byproduct. Thus, the engine vents water to a drain 139 along line 840. Likewise, the condensing heat exchanger 111 vents its water to the drain 139 along line 842. Having now described the mass flow of the basic embodiment of this invention, a plurality of alternate embodiments will now be described.

Figure 2:
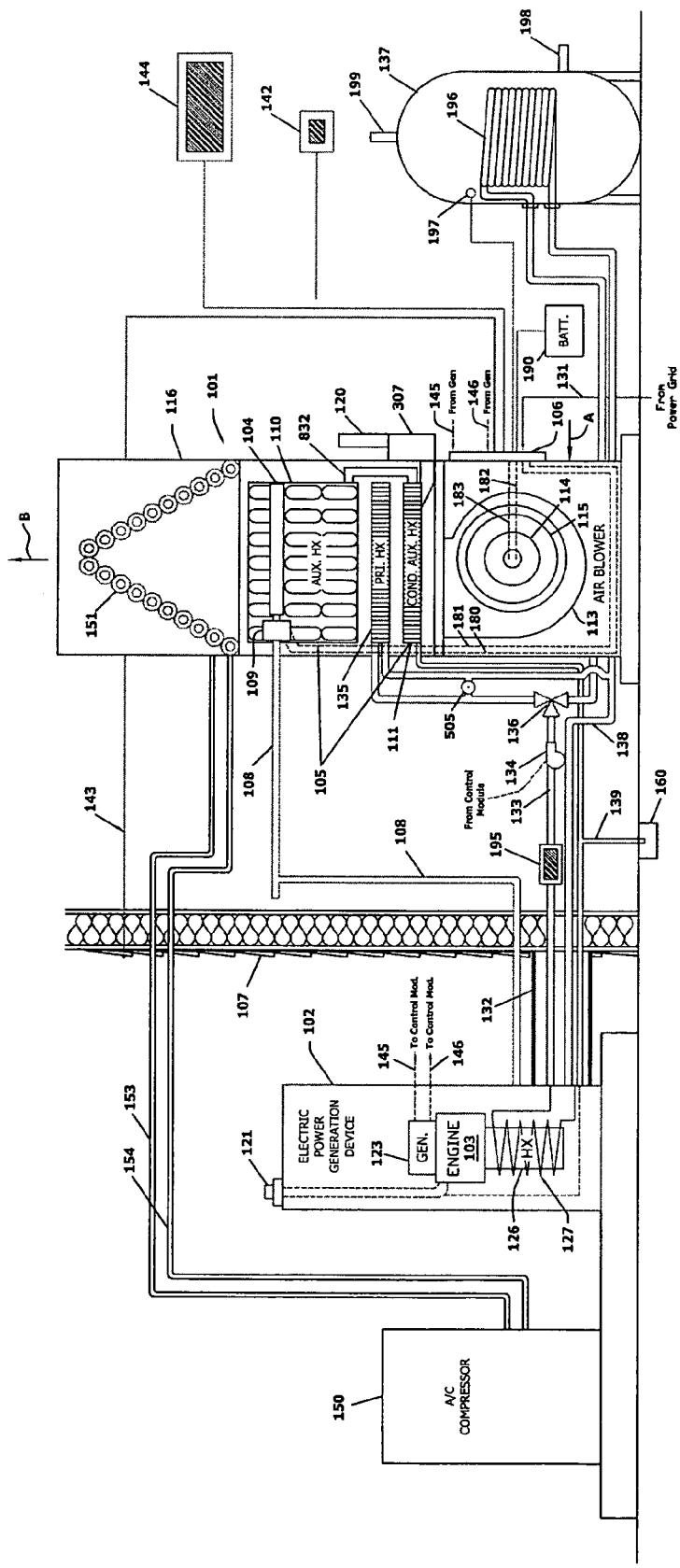
FIG. 2 is an exposed view of a warm air micro-CHP system according to an illustrative embodiment employing an outdoor-installed power generator and features for emergency operation and domestic water heating.

FIG. 2 shows an alternate embodiment warm air micro-CHP system in accordance with the invention. Note that for each of the figures described herein, common reference numbers shall refer to common components. Thus, FIG. 2 details two additional components of the liquid circulation system connecting the primary heat exchanger 135 and the electric power generator 102. These additional components are the heat dissipation heat exchanger 195 and the domestic water heating heat exchanger 196 located within an insulated hot water tank 137 (with domestic water supply inlet 198 and outlet 199). The flow of liquid heated by the power generator 102 can be directed by flow control valve 136 to the domestic water heating heat exchanger 196 upon a detection of a water heating demand by a water heater thermostat 197 or similar temperature sensing device. Preferably the control module 106 provides a control priority (via connection 732 in FIG. 6) to the heating of domestic water over that of space heating and signals the electric power generator 102 to start, if not already operating, when there is demand for water heating.

Figure 4:
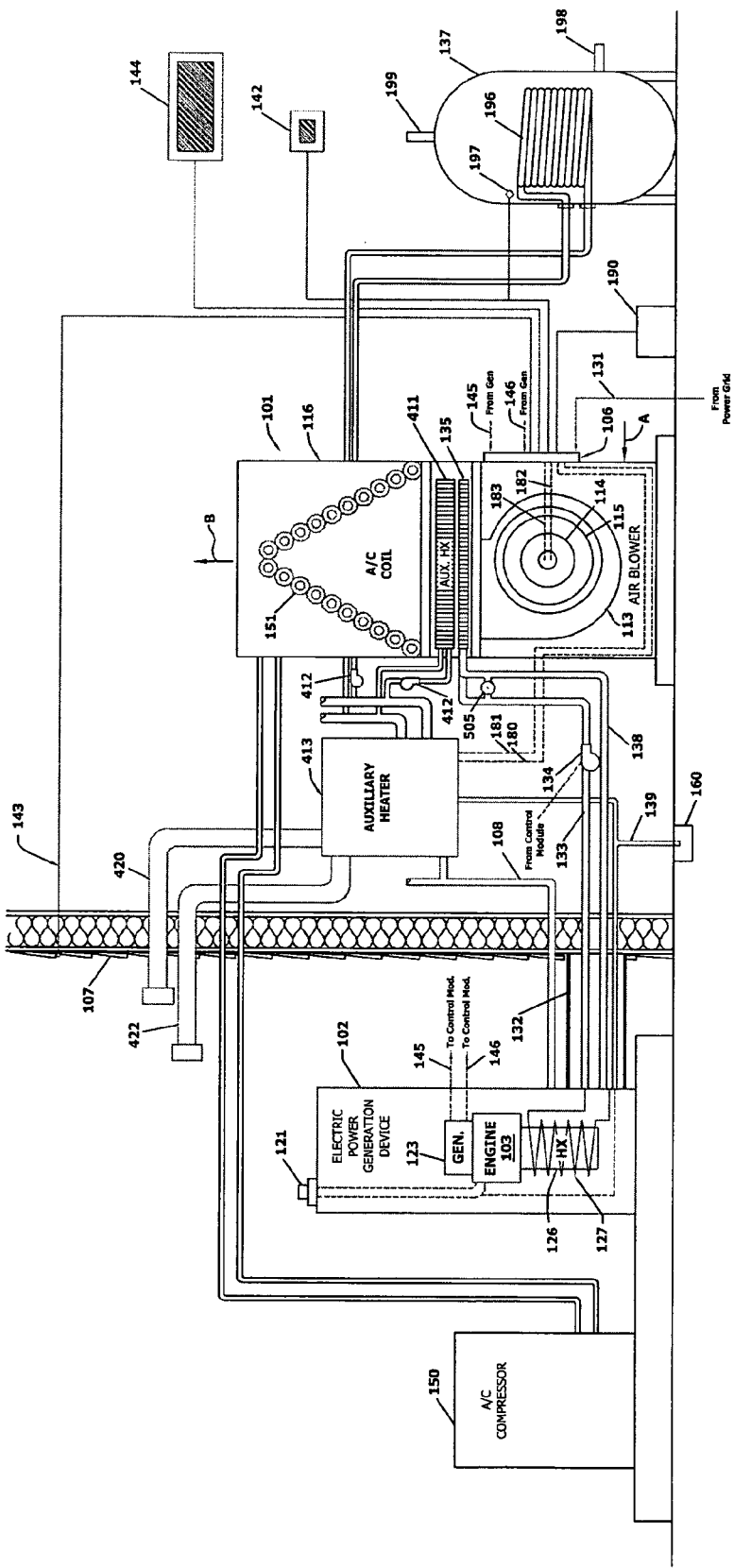
FIG. 4 is an exposed view of a warm air micro-CHP system according to an illustrative embodiment employing an outdoor-installed power generator with a liquid circulation auxiliary heater.

The domestic water heating heat exchanger 196 may be incorporated into any type of instantaneous (tankless) or storage-type (tanked) water heater, which itself may have an secondary source of heat for those conditions in which the electric generating device 102 cannot meet the demand for domestic hot water. For an example, as shown in FIG. 4, a separate hot water heater may be interconnected via a circulation zone to the heat exchanger 196 and an appropriate valve system can balance heating by the generator 102 versus the water heater.

The heat dissipation heat exchanger 195, shown in FIG. 2 inline with the source coolant conduit 133 from the generator 102, provides an enhanced operating capability to the embodiment of FIG. 1. The heat dissipation heat exchanger can be a finned radiator-like structure that dissipates heat through interaction with ambient air. It can be located within the interior or along the exterior of the building/structure. In operation, the heat dissipation heat exchanger 195 functions to remove heat from the system when three following conditions concurrently exist:

a) when the electric power generator 102 is operating during an electric grid outage;

b) when there is no demand for space or domestic water heating; and c) when it would be undesirable to dissipate unwanted heat into the interior space of the building using the primary heat exchanger 135.

Figure 3:
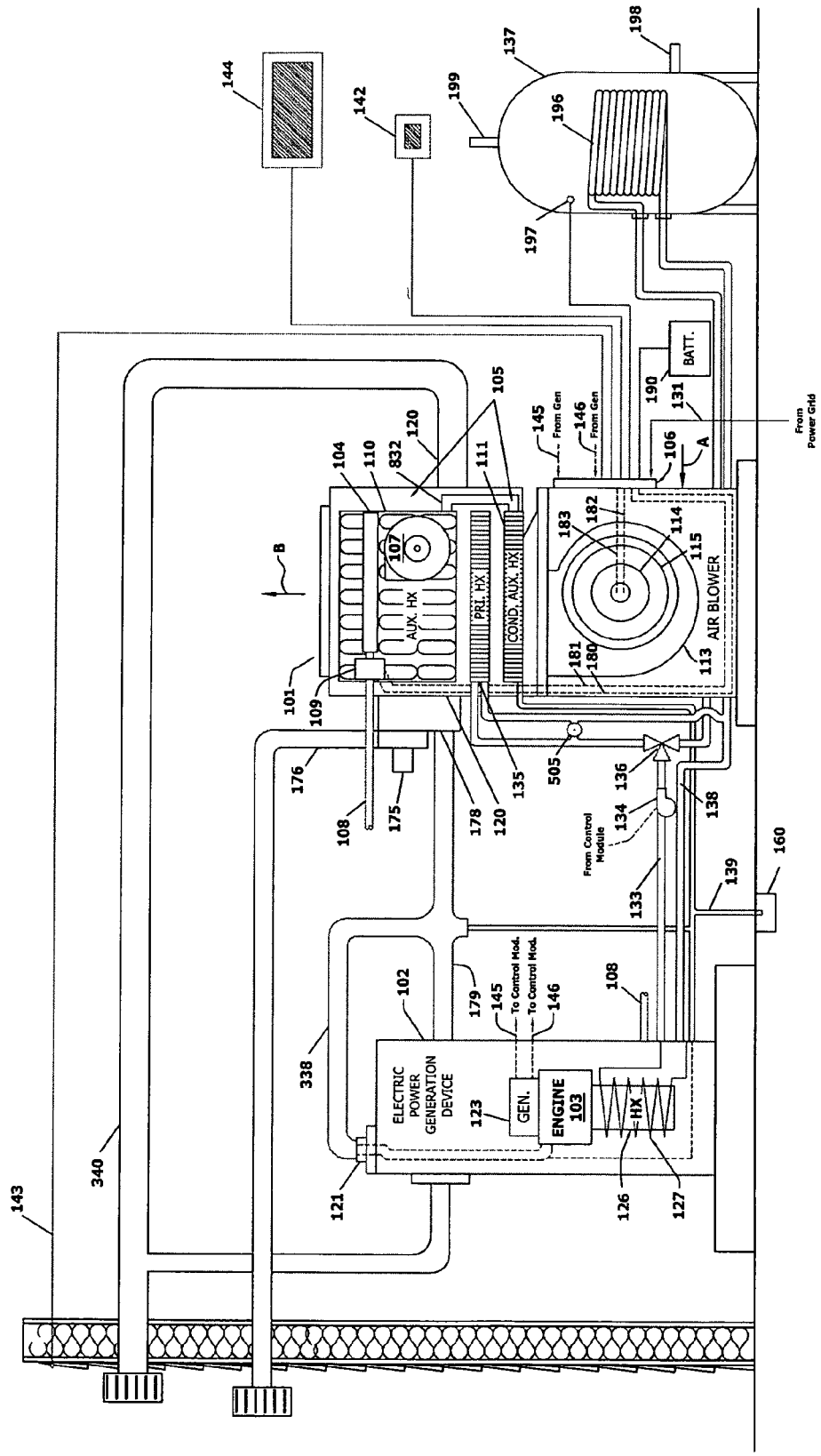
FIG. 3 is an exposed view of a warm air micro-CHP system according to an illustrative embodiment employing an indoor-installed power generator.

In FIG. 3, the electric power generator 102 is installed indoors, within the building walls 107. This generator, while structurally similar to that described for the outdoor configuration in FIGS. 1 and 2, can be specially adapted for indoor operation, having additional sound-deadening mechanisms and/or coverings and additional safety features, such as smoke/heat/carbon monoxide sensors and fire suppressing gear. In the illustrated configuration, the electric power generator 102 has a venting conduit 176 and 338 to the outdoors to vent combustion products. Similar to the configuration of FIG. 2, this warm air micro-CHP system is composed of a primary heat exchanger 135, auxiliary heater 105, coolant circulation conduits 133, 138, variable or multi-speed air blower 113, control module 106, control display 144, and indoor thermostat 142. Preferably, but not necessarily, the combustion gas vent 120 of the auxiliary heater 105 is combined with the vent 338 of the electric power generator 102 for the purposes of simplifying installation.

Also described in FIG. 3 is a combustion products blower 175 that is used to induce a negative pressure at the vents of both the electric power generator 102 and the auxiliary heater 105 so as to force the exhaust gas, at low positive pressure to the outdoors through the vent conduit 176. This configuration applies to either natural or forced draft combustion versions of both the electric power generator 102 and the auxiliary heater 105. Proof of venting flow capability (i.e. absence of a blocked vent) in such an arrangement can be provided by use of negative pressure gas sensor (not shown) at the inlet 178 to the combustion products blower 175.

The venting arrangement shown in FIG. 3 also prevents backflow of combustion gases from the electric power generation device into the auxiliary heater during periods when the auxiliary heater is not operating. Significant blockage of the vent conduit downstream of the combustion products blower 175, due to debris or other factors, is detectable by the failure to achieve a predetermined negative pressure at the inlet 178. The venting arrangement shown in FIG. 3 can also used by way of a heater cabinet venting conduit 179 to vent incidental gas or fume emissions from the electric power generation device that may be a hazard or an annoyance, such as lubrication oil fumes or small combustion product leakages. The combustion products blower 175 is preferably of a multi-speed type, with the speed controlled in response to the status of operation of the electric power generation device 102 and the auxiliary heater 105 so as to minimize power consumption and unnecessary flow of air through non-operating components.

FIG. 4 details yet another embodiment of the warm air micro-CHP system in accordance with this invention that provides an alternative arrangement of the auxiliary heater. In this embodiment, the auxiliary heater is implemented as subsystem that uses a liquid stream to transfer heat from combustion gases to the air stream supplied to the heated space. More particularly, auxiliary heater function is achieved using a separate liquid circulation circuit. The auxiliary heater, thus, is composed of a liquid-to-air heating coil 411 interposed within the airflow of the heater cabinet, auxiliary pump or pumps 412 for circulating heated liquid, and a fuel-fired liquid heater 413 of conventional design. Note that this heater 413 has an intake stack 420 and exhaust stack 422 each vented outside the building wall 107. This separate liquid-heated loop configuration has the advantage of removing the point of combustion for the auxiliary heater from a location necessarily adjacent to the heated air stream and allows for one fuel-fired heater 413 to supply auxiliary heat to multiple air blower and heat exchanger units (including the domestic heated water tank 137 and coil 196) that serve different heated zones in the building. This implementation is, thus, comparable to the well-known conventional "hydro-air" heating systems that utilize a central boiler and multiple air handling units each containing a liquid-to-air heat exchanger and an air blower.

The separation of the auxiliary heater liquid circulation loop from the primary heat exchanger loop is especially advantageous for the outdoor location of the electric generating device 102 since the liquid circuit of the electric generating device may require more costly, frequently serviced and specialized liquid coolant with anti-freeze and anti-corrosion properties, while the auxiliary heater liquid circulation circuit may be implemented using simple water and standard hydronic piping practices.

Figure 5:
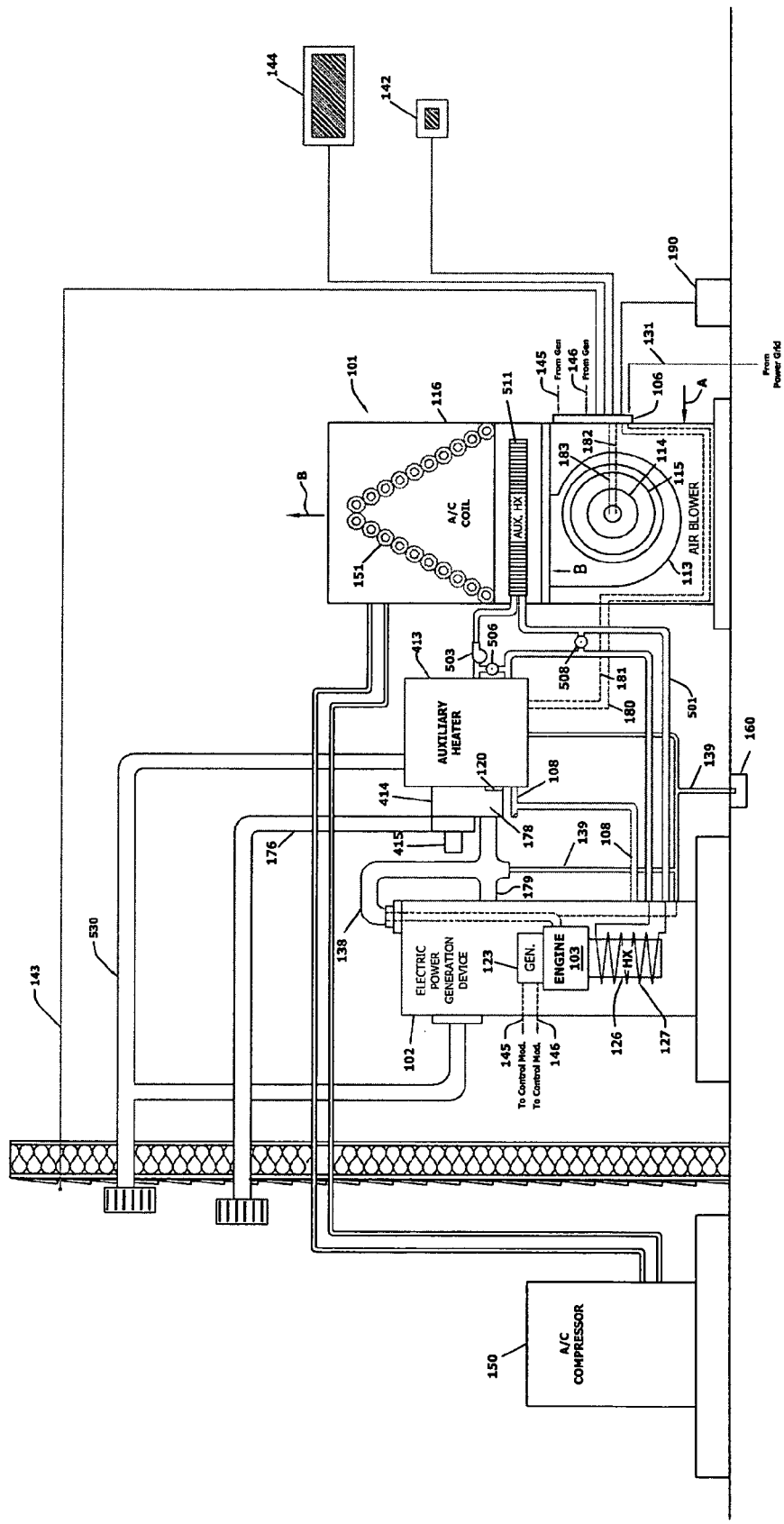
FIG. 5 is an exposed view of a warm air micro-CHP system according to an illustrative embodiment employing an indoor-installed power generator with a combined liquid circulation primary heat exchanger and auxiliary heater.

As shown in the alternate embodiment of FIG. 5, the elements composing the auxiliary heater can also be incorporated into one liquid circulation circuit that provides both the function of the primary heat exchanger 135 (of FIG. 1) and auxiliary heater 105 (also of FIG. 1) in a single heat exchange circuit. The invention, is thus composed a single liquid circulation circuit 501 that includes a heater-cabinet-mounted heat exchange coil 511, circulation pump 503 directing liquid to the coil 511, an electric power generator 102, and an auxiliary liquid heater 413 as described above. In essence, the primary heat exchanger for air heating and the auxiliary exchanger for air heating are essentially one functional unit for the transfer of heat from the liquid stream to the air stream supplied to the heated space. While not shown, the embodiment of FIG. 5 can also incorporate the previously described heat dissipation heat exchanger 195 and the domestic water heating heat exchanger 196, and other useful features described herein.

In operation, the pump 503 of the system of FIG. 5 provides circulation at any time when the control module 106 calls for the electric power generator 102 to operate, or both the electric power generator 102 and the auxiliary liquid heater 413 to operate together. The pump 503 desirably has at least two-speed capability so as to minimize the pumping power consumed while the generator is operating (using low pump speed at this time). However, the pump is capable of providing an adequate flow and reasonable temperature rise of the liquid coolant when the typically higher thermal output of the auxiliary heater is applied (using, for example, the higher pump speed). The electric power generator 102 and the auxiliary heater are connected in series by the liquid conduit 501, with the electric power generator 102 desirably located upstream of the auxiliary heater 413 in the airflow in order to provide the coolest temperature possible for the cooling of the electric power generator 102.

The embodiment shown in FIG. 5 may include an electric power generator automatic bypass valve 508 that is opened when the auxiliary heater is operating and the liquid circulation rate is high—thus accommodating the high flow rate and not imposing the entire liquid flow on the electric power generator's heat exchanger. The liquid circulation circuit shown in FIG. 5 may also include an auxiliary liquid heater automatic bypass valve 506 that is opened when the auxiliary liquid heater 413 is not operating and the liquid circulation rate is low, thus not imposing the heated liquid flow through the auxiliary liquid heater 413. At this time, only the low-heat output of the electric generating device is present, therefore it is of interest to minimize heat losses and pumping losses that may otherwise result from heated liquid circulation through the non-operating auxiliary heater.

The air blower 113 is operated at varying speed and air volume flow rates that provide an appropriate amount of airflow at the different heat input rates present when (a) only the electric power generator 102 is operating or (b) both the power generator 102 and the auxiliary liquid heater 413 are operating. Note, in this embodiment an inline heat dissipation heat exchanger can be implemented as any of a number of water cooled or air cooled devices that use available water or ambient air to dissipate unneeded heat from the liquid circulation loop during periods of high-output electric generator operation in the event electric grid outage.

If the auxiliary liquid heater 413 is either a forced-combustion or induced-combustion type, with a mechanical blower 415, as shown in FIG. 5, the operation of the mechanical combustion blower 415, without fuel burning or ignition, may also serve as a mechanism for dissipation of unwanted heat from the liquid circulation loop during high-output operation of the electric power generator for periods of electric grid outage.

In addition, while FIG. 5 details the electric power generator 102 in an indoor installation, it is expressly contemplated that the generator 102 of this single liquid circuit embodiment may also be located outdoors. Also, the combustion gas vents of the auxiliary liquid heater 413 and the electric power generator 102 may be combined into a single combustion exhaust vent 530, like that provided in the embodiment of FIG. 3 above.

Figure 7:
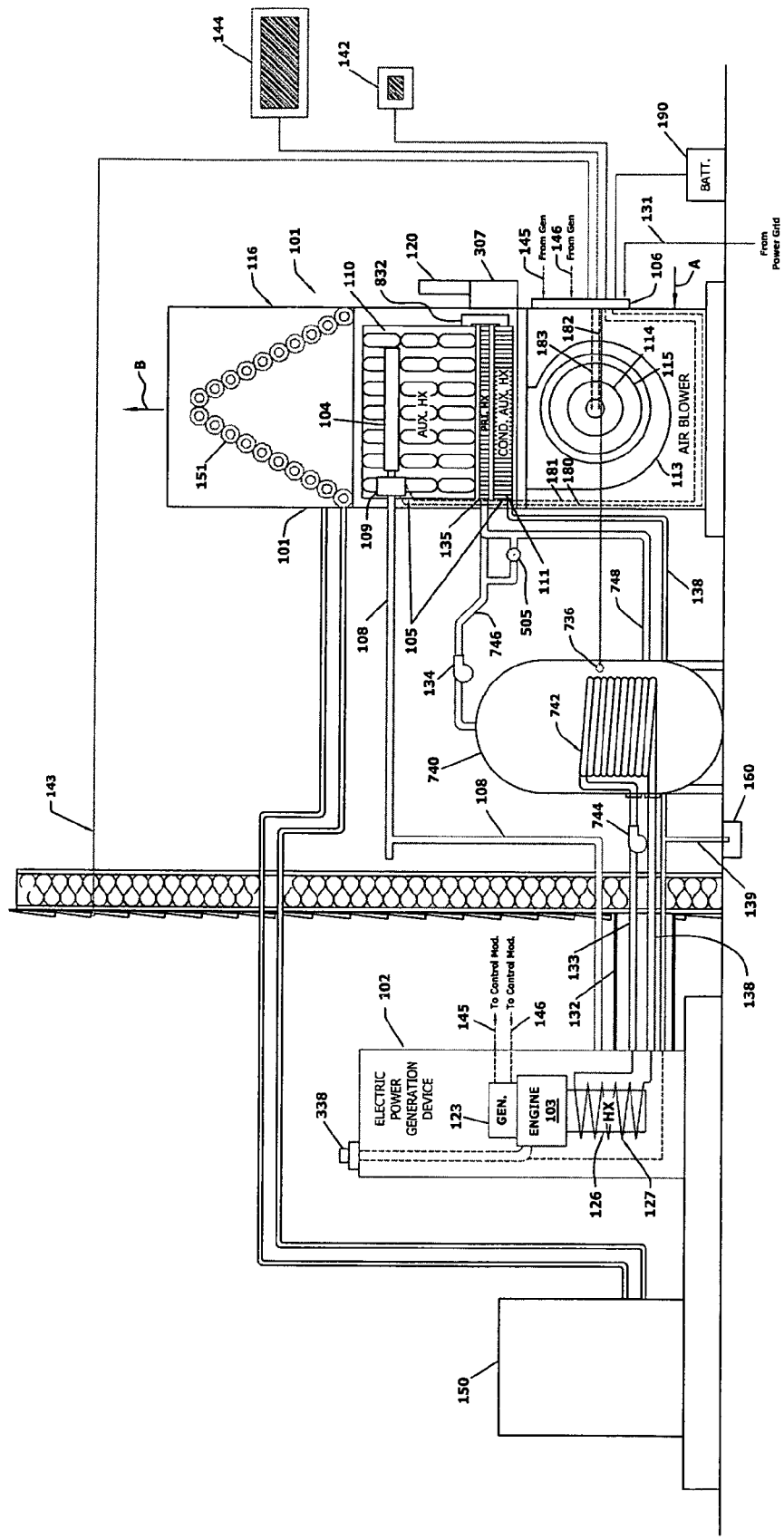
FIG. 7 is an exposed view of a warm air micro-CHP system according to an illustrative embodiment employing an outdoor-installed power generator with a thermal storage buffer tank.

FIG. 7 details a further embodiment of a warm-air micro-CHP system that includes a thermal storage buffer tank 740 located to exchange heat between the electric power generator 102 and the primary heat exchanger 135. Warm coolant is directed from the generator 102 (through conduits 133 and 138) using an inline liquid circulation pump 744. The heated coolant enters a coil heat exchanger 742 within the tank 740. The coil 720 heats water in the tank that makes a circuit through the primary heat exchanger 135. This configuration has a particular advantage when the heat output of the electric power generator 102 is below the minimum heating rate desired from the space heating system. In this configuration, the electric power generator operates continuously during periods of detected heat demand (as discussed with respect to the embodiment of FIG. 1) with circulation of liquid to and from the thermal storage buffer tank 740 via conduits 746 and 748. The water in the thermal storage buffer tank 740 may be part of a closed circuit water system or may be a flow-through potable water system.

As the temperature of the thermal storage buffer tank 740 reaches a set upper level and there is a demand for heat, a temperature sensor 736 signals the control module 106 to start the primary heat exchanger pump 134 to drive liquid through the conduit 746 to the primary heat exchanger 135. The module also operates the air blower 113 at this time to transfer heat from the tank contents (via the exchanger 135) to the air stream at rate that generally exceeds the rate of heat generation rate of the electric power generating device 102—thus lowering the temperature of the thermal storage buffer tank 740. Once the thermal storage buffer tank 740 has reached a set lower temperature level, the sensor 736 signals the module 106 to stop the primary heat exchanger pump 134 and air blower 113.

As shown in FIG. 7, the liquid of the thermal storage buffer tank 740 is isolated from the coolant running through circulation lines (133, 138) connected to the electric power generator 102 by means of a heat exchanger coil 742. This configuration is desirable when the liquid coolant of the electric power generator 102 is a more-costly and specialized liquid coolant with anti-freeze and anti-corrosion properties. Note that a thermal storage buffer tank 740 connected with an indoor-installed electric power generator as described above may not require the use of the interposed heat exchange coil (since freezing is typically not a concern), with the same coolant circulating through the electric power generating device 102, the thermal storage buffer tank 740, and the primary heat exchanger 135.

The various warm air micro-CHP systems shown in the above-described figures, in accordance with various embodiments of the present invention taken alone, and in various combinations of components, provide a system and method for the practical and optimum routine utilization of a liquid-cooled electric power and heat generating device, with low heat output capability, for routine cogeneration and emergency generation of electric power as part to a warm air space heating system that employs conventional warm air heating technology and provides a heat delivery capacity sufficient to maintain of thermal comfort in the building under all weather and heat-demand operating conditions.

The foregoing has been a detailed description of illustrative embodiments of the invention. Various modifications can be made without departing from the spirit and scope thereof. For example, the air heating assembly shown herein can be oriented horizontally or vertically and the various heat exchangers used in the air heating assembly and elsewhere in the system can have a variety of shapes, and are formed from a variety of materials. Likewise, the performance specifications of various system components, such as the electric power generator, are sized to an average building. The specifications can be changed to better suit buildings with higher or lower power consumption and heating needs. In addition, while a grid is shown as the external power source, another external power source such as a main larger-output generator can also be the external power source. Accordingly, this description is meant to be taken only by way of example, and not to otherwise limit the scope of the invention.

What is claimed is:

1. A system for the space-heating of a building to a desired temperature and generation of electrical power comprising:
    a fuel-burning electric power generator being electrically connected to the building electrical service in conjunction with an electrical connection from an external electrical power source, the electric power generator being constructed and arranged to transfer heat produced by the generator therefrom to a first circulating liquid stream;
    an air blower through which airflow is driven for heating the building;
    a primary heat exchanger mounted inline with the air blower so as to transfer heat to the airflow, the primary heat exchanger receiving heat from the first circulating liquid stream;
    an auxiliary heater, fueled by combustible fuel, located in line with the blower so as to transfer additional heat to the airflow, the auxiliary heater being heated by an auxiliary heat source separate from and not thermally connected to the electric generator; and
    a control module that operates the primary heat exchanger, the auxiliary heater, is the blower and the electric power generator to maintain the desired temperature while optimizing utilization of electric power generator.

2. A system for the space-heating of a building to a desired temperature and generation of electrical power comprising:
    a fuel-burning electric power generator being electrically connected to the building electrical service in conjunction with an electrical connection from an external electrical power source, the electric power generator being constructed and arranged to transfer heat produced by the generator therefrom to a first circulating liquid stream;
    an air blower through which airflow is driven for heating the building;

a primary heat exchanger mounted inline with the air blower so as to transfer heat to the airflow, the primary heat exchanger receiving heat from the first circulating liquid stream;

an auxiliary heater located in line with the blower so as to transfer additional heat to the airflow, the auxiliary heater being heated by an auxiliary heat source separate from and not thermally connected to the electric generator;

a control module that operates the primary heat exchanger, the auxiliary heater, the blower and the electric power generator to maintain the desired temperature while optimizing utilization of electric power generator; and wherein the auxiliary heater includes a non-condensing combustion gas type heat exchanger located downstream in the airflow of the primary heat exchanger and a condensing combustion gas type heat exchanger located upstream of the primary heat exchanger and being interconnected by a bridge around the primary heat exchanger to the condensing combustion gas type heat exchanger.

3. The system as set forth in claim 1 wherein the blower is constructed and arranged to operate at a plurality of different speed levels to produce different levels of airflow, each of the speed levels being controlled by the control module.

4. The system as set forth in claim 1 wherein the auxiliary heater includes a heat exchanger that receives heat from a second circulated liquid stream that is heated by an auxiliary liquid heater.

5. The system as set forth in claim 1 wherein the auxiliary heater comprises a second circulated liquid stream that is heated by an auxiliary liquid heater and the second circulated liquid stream is directed to the primary heat exchanger in combination with the first circulated liquid stream.

6. The system as set forth in claim 1 wherein the control module is constructed and arranged to control a rate of heat transfer from the auxiliary heater to the airflow by controlling a rate at which fuel is burned by the auxiliary heater.

7. The system as set forth in claim 6 wherein the control module is constructed and arranged to vary the blower speed in response to a total amount of heat transferred to the airflow from both the primary heat exchanger and the auxiliary heater, whereby a higher airflow rate is provided at a higher amount of heat transfer from both the primary heat exchanger and the auxiliary heat exchanger.

8. The system as set forth in claim 1 wherein the control module is constructed and arranged to:
  a) first exclusively operate the primary heat exchanger to transfer heat to the airflow, and
  b) if space heat demand cannot be satisfied by (a), then operate the auxiliary heater in combination with the primary heat exchanger to transfer the additional heat to the airflow.

9. A system for the space-heating of a building to a desired temperature and generation of electrical power comprising:
  a fuel-burning electric power generator being electrically connected to the building electrical service in conjunction with an electrical connection from an external electrical power source, the electric power generator being constructed and arranged to transfer heat produced by the generator therefrom to a first circulating liquid stream;
  an air blower through which airflow is driven for heating the building;
  a primary heat exchanger mounted inline with the air blower so as to transfer heat to the airflow, the primary heat exchanger receiving heat from the first circulating liquid stream;
  an auxiliary heater located in line with the blower so as to transfer additional heat to the airflow, the auxiliary heater being heated by an auxiliary heat source separate from and not thermally connected to the electric generator;
  a control module that operates the primary heat exchanger, the auxiliary heater, the blower and the electric power generator to maintain the desired temperature while optimizing utilization of electric power generator; and
  wherein the electric power generator includes a vent pipe for generator combustion gasses interconnected with a vent pipe from the auxiliary heater for auxiliary heater combustion gasses.

10. The system as set forth in claim 9 wherein the electric power generator is located in an interior space of the building.

11. The system as set forth in claim 9 wherein the electric power generator is located outside the building with an insulated cover enclosing conduits for carrying the first circulating liquid stream and a line for draining condensate from the electric power generator.

12. The system as set forth in claim 1 wherein the control module is constructed and arranged to direct electrical power to a plurality of components of the system so as to maintain operation of the primary heat exchanger, air blower and auxiliary heater to provide space heat to the building at a desired temperature.

13. A system for the space-heating of a building to a desired temperature and generation of electrical power comprising:
  a fuel-burning electric power generator being electrically connected to the building electrical service in conjunction with an electrical connection from an external electrical power source, the electric power generator being constructed and arranged to transfer heat produced by the generator therefrom to a first circulating liquid stream;
  an air blower through which airflow is driven for heating the building;
  a primary heat exchanger mounted inline with the air blower so as to transfer heat to the airflow, the primary heat exchanger receiving heat from the first circulating liquid stream;
  an auxiliary heater located in line with the blower so as to transfer additional heat to the airflow, the auxiliary heater being heated by an auxiliary heat source separate from and not thermally connected to the electric generator;
  a control module that operates the primary heat exchanger, the auxiliary heater, the blower and the electric power generator to maintain the desired temperature while optimizing utilization of electric power generator;
  wherein the control module is constructed and arranged to direct electrical power to a plurality of components of the system so as to maintain operation of the primary heat exchanger, air blower and auxiliary heater to provide space heat to the building at a desired temperature; and
  wherein the control module and the electric power generator are each constructed and arranged to operate the electric power generator at an electric power output level greater than a continuous running electric power output level when power is unavailable from the external electric power source, the electric power generator being operable while power is unavailable from the external electric power source with or without a request for space heat.

14. The system as set forth in claim 13 further comprising a heat dissipater interconnected with the first circulated liquid stream, to dissipate heat to an outdoor location when a request for space heat is not present.

15. The system as set forth in claim 1 wherein the first circulated liquid stream is directed to a heat exchanger that transfers heat to domestic water for the building.

16. A system for the space-heating of a building to a desired temperature and generation of electrical power comprising:
- a fuel-burning electric power generator being electrically connected to the building electrical service in conjunction with an electrical connection from an external electrical power source, the electric power generator being constructed and arranged to transfer heat produced by the generator therefrom to a first circulating liquid stream;
- an air blower through which airflow is driven for heating the building;
- a primary heat exchanger mounted inline with the air blower so as to transfer heat to the airflow, the primary heat exchanger receiving heat from the first circulating liquid stream;
- an auxiliary heater located in line with the blower so as to transfer additional heat to the airflow, the auxiliary heater being heated by an auxiliary heat source separate from and not thermally connected to the electric generator;
- a control module that operates the primary heat exchanger, the auxiliary heater, the blower and the electric power generator to maintain the desired temperature while optimizing utilization of electric power generator;
- wherein the first circulated liquid stream is directed to a heat exchanger that transfers heat to domestic water for the building; and
- a valve assembly for controlling the first circulated liquid stream between the primary heat exchanger and the heat exchanger that produces warmed domestic water so that priority can be given to transferring heat to the domestic water over transferring heat to the primary heat exchanger.

17. The system as set forth in claim 1 wherein the control module and the blower are constructed and arranged to operate the blower at a plurality of airflow speeds and herein the control module is adapted to operate the blower at a predetermined low speed when heat is transferred to the airflow only from the primary heat exchanger and at a higher speed than the predetermined low speed when heat is transferred to the airflow from both the primary heat exchanger and the auxiliary heater.

18. The system as set forth in claim 1 wherein the control module is operatively connected to each of an indoor thermostat and a remote control panel that displays system operating status and that enables control of system component operation by a user.

19. The system as set forth in claim 18 further comprising an outdoor temperature sensor operatively connected with the control module so as to enable the module to adjust system performance based upon the outdoor temperature.

20. The system as set forth in claim 1 further comprising a cabinet that encloses together the air blower, the primary heat exchanger and the auxiliary heater.

21. The system as set forth in claim 20 further comprising an air-cooling unit located in line with the air blower.

22. The system as set forth in claim 1 wherein the control module includes an interconnection that can be accessed remotely to operate the electric power generator including enabling operation of the electric power generator when the external power source is unavailable.

23. The system as set forth in claim 1 wherein the electric power generator includes an engine that is one of a (a) liquid-cooled internal combustion engine, (b) liquid-cooled Stirling engine, (c) steam engine, and (d) liquid-cooled fuel cell.

24. The system as set forth in claim 1 wherein at least one of the first circulated liquid stream and the auxiliary heater transfer heat to at least one heat-using device in the building.

25. The system as set forth in clam 24 further comprising a bypass valve that directs the first circulated liquid stream away from the primary heat exchanger and to a heat exchanger that transfers heat to the at least one heat-using device.

26. A method for space heating a building and generating electric power for the electrical service of the building in conjunction with an external electric power source that is also interconnected with the building electrical service comprising the steps of:
- a) operating a liquid-cooled electric power generator at a continuous running rated output level to deliver electricity to the electrical service when a request for space heat is made and while operating the electric power generator circulating coolant from the electric power generator to a primary heat exchanger inline with an air blower so as to transfer heat to an airflow driven by the blower; and
- b) operating an auxiliary heater inline, with the air blower when heat transferred from the primary heat exchanger is insufficient to provide desired space heat to the building, wherein each step of operating includes providing a common combustible fuel to each of the electrical power generator and the auxiliary heater.

27. The method as set forth in claim 26 further comprising emergency-operating the electric power generator either when a demand for space heat is made or a demand for space heat is not made when electric power is unavailable from the external power source and, when a demand for space heat is not made, dissipating to an outdoor location heat in the circulated coolant.

28. The method as set forth in claim 27 wherein the step of emergency-operating includes operating the electric power generator at an output level that is higher than the continuous running rated output level.

29. The method as set forth in claim 26 further comprising providing fuel to the electric power generator and the auxiliary heater from a single fuel source.

30. The method as set forth in claim 26 further comprising operating the air blower at a low airflow speed when space heat from only the primary heat exchanger is desired and at a higher airflow speed when heat from the auxiliary heater combined with primary heat exchanger is desired.

31. The method as set forth in claim 26 further comprising controlling operation of the primary heat exchanger and the auxiliary heater to:
- c) first exclusively operate the primary heat exchanger to transfer heat to the airflow, and if space heat demand cannot be satisfied by (a), then operate the auxiliary heater in combination with the primary heat exchanger to transfer the additional heat to the airflow.

32. A system for the space-heating of a building to a desired temperature and generation of electrical power comprising:
- a fuel-burning electric power generator being electrically connected to the building electrical service in conjunction with an electrical connection from an external electrical power source, the electric power generator being constructed and arranged to transfer heat produced by the generator therefrom to a first circulating liquid stream;
- an air blower through Which airflow is driven for heating the building;
- a primary heat exchanger mounted inline with the air blower so as to transfer heat to the airflow, the primary heat exchanger receiving heat from the first circulating liquid stream;
- an auxiliary heater located in line with the blower so as to transfer additional heat to the airflow, the auxiliary heater being heated by an auxiliary heat source, being fueled by a combustible fuel, separate from and not thermally connected to the electric generator;
- a control module that operates the primary heat exchanger, the auxiliary heater, the blower and the electric power generator to maintain the desired temperature while optimizing utilization of electric power generator; and
- wherein the auxiliary heater is a non-condensing combustion gas type heat exchanger located downstream in the airflow of the primary heat exchanger.

33. A system for the space-heating of a building to a desired temperature and generation of electrical power comprising:
- a fuel-burning electric power generator being electrically connected to the building electrical service in conjunction with an electrical connection from an external electrical power source, the electric power generator being constructed and arranged to transfer heat produced by the generator therefrom to a first circulating liquid stream;
- an air blower through which airflow is driven for heating the building;
- a primary heat exchanger mounted inline with the air blower so as to transfer heat to the airflow, the primary heat exchanger receiving heat from the first circulating liquid stream;
- an auxiliary heater located in line with the blower so as to transfer additional heat to the airflow, the auxiliary heater being heated by an auxiliary heat source separate from and not thermally connected to the electric generator;
- a control module that operates the primary heat exchanger, the auxiliary heater, the blower and the electric power generator to maintain the desired temperature while optimizing utilization of electric power generator; and
- wherein the auxiliary heater includes both a non-condensing combustion gas type heat exchanger and a condensing combustion gas type heat exchanger located upstream of the primary heat exchanger, wherein the non-condensing combustion gas type heat exchanger and the condensing combustion gas type heat exchanger are interconnected by a bridge to a common gas flow stream.

34. A system for the space-heating of a building to a desired temperature and generation of electrical power comprising:
- a fuel-burning electric power generator being electrically connected to the building electrical service in conjunction with an electrical connection from an external electrical power source, the electric power generator being constructed and arranged to transfer heat produced by the generator therefrom to a first circulating liquid stream;
- an air blower through which airflow is driven for heating the building;
- a primary heat exchanger mounted inline with the air blower so as to transfer heat to the airflow, the primary heat exchanger receiving heat from the first circulating liquid stream;
- an auxiliary heater located in line with the blower so as to transfer additional heat to the airflow, the auxiliary heater being heated by an auxiliary heat source, being fueled by a combustible fuel, separate from and not thermally connected to the electric generator;
- a control module that operates the primary heat exchanger, the auxiliary heater, the blower and the electric power generator to maintain the desired temperature while optimizing utilization of electric power generator; and
- wherein the auxiliary heater is a non-condensing combustion gas type heat exchanger located upstream in the airflow of the primary heat exchanger.

35. The system as set forth in claim 2 wherein the blower is constructed and arranged to operate at a plurality of different speed levels to produce different levels of airflow, each of the speed levels being controlled by the control module.

36. The system as set forth in claim 32 wherein the blower is constructed and arranged to operate at a plurality of different speed levels to produce different levels of airflow, each of the speed levels being controlled by the control module.

37. The system as set forth in claim 33 wherein the blower is constructed and arranged to operate at a plurality of different speed levels to produce different levels of airflow, each of the speed levels being controlled by the control module.

38. The system as set forth in claim 34 wherein the blower is constructed and arranged to operate at a plurality of different speed levels to produce different levels of airflow, each of the speed levels being controlled by the control module.

39. A system for the space-heating of a building to a desired temperature and generation of electrical power comprising:
- a fuel-burning electric power generator being electrically connected to the building electrical service in conjunction with an electrical connection from an external electrical power source, the electric power generator being constructed and arranged to transfer heat produced by the generator therefrom to a first circulating liquid stream;
- an air blower through which airflow is driven for heating the building;
- a primary heat exchanger mounted inline with the air blower so as to transfer heat to the airflow, the primary heat exchanger receiving heat from the first circulating liquid stream;
- an auxiliary heater, fueled by combustible fuel, located in line with the blower so as to transfer additional heat to the airflow, the auxiliary heater being heated by an auxiliary heat source separate from and not thermally connected to the electric generator, wherein the auxiliary heater includes a heat exchanger that receives heat from a second circulated liquid stream that is heated by an auxiliary liquid heater; and a control module that operates the primary heat exchanger, the auxiliary heater, the blower and the electric power generator to maintain the desired temperature while optimizing utilization of electric power generator.

40. The system as set forth in claim 39 wherein the second circulated liquid stream is directed to the primary heat exchanger in combination with the first circulated liquid stream.

41. The system of claim 1 wherein the first liquid circulating stream includes an automatic temperature-operated valve that bypasses all or part of the first circulating liquid stream around the primary heat exchanger during a condition of operation that produces a temperature below a desired minimum value in the first liquid circulating stream as the first circulating liquid stream enters the electric power generator.

42. A system for the space-heating of a building to a desired temperature and generation of electrical power comprising:

a fuel-burning electric power generator being electrically connected to the building electrical service in conjunction with an electrical connection from an external electrical power source, the electric power generator being constructed and arranged to transfer heat produced by the generator therefrom to a first circulating liquid stream;

an air blower through which airflow is driven for heating the building;

a primary heat exchanger mounted inline with the air blower so as to transfer heat to the airflow, the primary heat exchanger receiving heat from the first circulating liquid stream;

an auxiliary heater located in line with the blower so as to transfer additional heat to the airflow, the auxiliary heater being heated by an auxiliary heat source, being fueled by a combustible fuel, separate from and not thermally connected to the electric generator;

a control module that operates the primary heat exchanger, the auxiliary heater, the blower and the electric power generator to maintain the desired temperature while optimizing utilization of electric power generator; and wherein the auxiliary heater includes both a non-condensing combustion gas type heat exchanger and a condensing combustion gas type heat exchanger located downstream of the primary heat exchanger, wherein the non-condensing combustion gas type heat exchanger and the condensing combustion gas type heat exchanger are interconnected by a bridge to a common gas flow stream.

43. The system as set forth in claim 42 wherein the blower is constructed and arranged to operate at a plurality of different speed levels to produce different levels of airflow, each of the speed levels being controlled by the control module.

* * * * *